June 10, 1947. H. E. GOLDSTINE 2,421,933
DIMENSION MEASURING DEVICE
Filed May 3, 1943

INVENTOR
HALLAN E. GOLDSTINE.
BY H.S. Brover
ATTORNEY

Patented June 10, 1947

2,421,933

UNITED STATES PATENT OFFICE 2,421,933

DIMENSION MEASURING DEVICE

Hallan E. Goldstine, Port Jefferson, N. Y., assignor to Radio Corporation of America, a corporation of Delaware Application May 3, 1943, Serial No. 485,459

8 Claims. (Cl. 33—147)

The present invention relates to a high precision measuring device for checking and recording dimensions, and finds an especial field of use where it is desired to compare the dimensions of test samples relative to that of a standard.

By means of the present invention, it is possible to quickly determine the deviation in millionths of an inch of the dimensions of a sample compared to a standard. For this purpose, there is employed a high Q (low loss) electrical high frequency resonator in the form of an enclosed chamber whose resonant frequency is directly proportional to its dimensions. By making the dimensions of the resonator adjustable solely in dependence upon the thickness of the article to be measured, it is possible to obtain a highly accurate determination of the difference in dimensions between the sample and the standard. According to one embodiment of the invention, the electrical resonator is in the form of a concentric line whose inner conductor is controlled as to length by means of a rod of very low temperature coefficient material, such as Invar. This general type of resonator is described in Kroger United States Patent 2,108,895, granted February 22, 1938. According to another embodiment of the invention, the electrical resonator is in the form of an enclosed metallic cavity whose walls are made of material having a very low temperature coefficient such as Invar coated on the inside with highly electrical conductive material, such as silver, copper or gold. Both types of resonators are preferably provided with metallic bellows which are arranged to extend or contract in response to changes in the dimensions of the article to be measured. If desired, other means than bellows may be employed to change the resonant frequency of the resonator in response to changes in the dimensions of the sample; for example, a rod may be inserted in the cavity to vary the frequency thereof in accordance with variations in the dimensions of the article to be checked.

Figure 1:
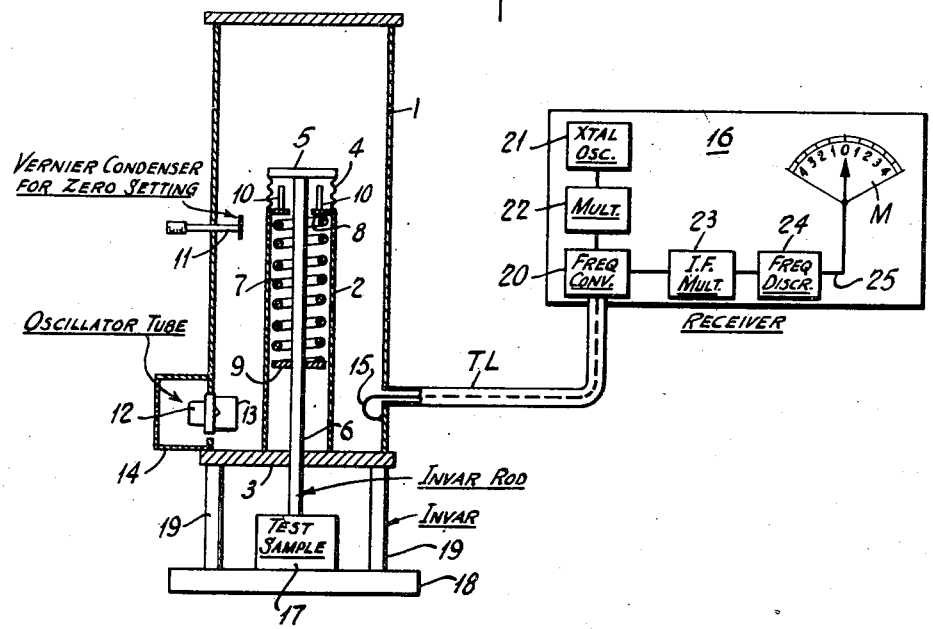
Figure 2:
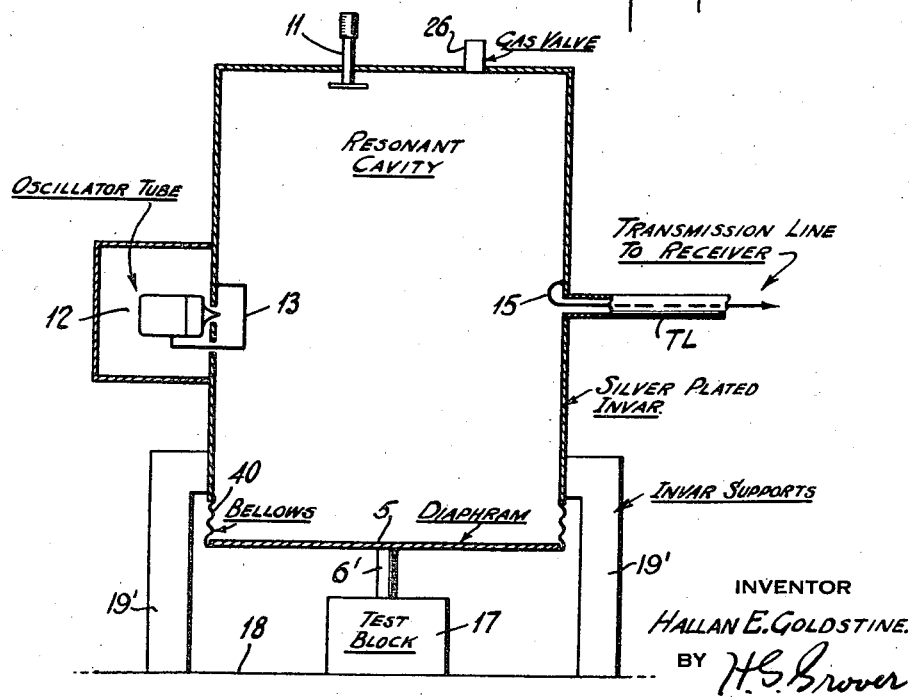

A more detailed description of the invention follows in conjunction with a drawing, wherein Figs. 1 and 2 show two embodiments of the present invention.

In Fig. 1 the measuring system of the invention includes, among other things, a high Q concentric line resonator having an outer conductor 1 and an inner conductor 2, both being connected together at one end of the line by a metallic end plate 3. The inner conductor 2 is provided at one end with a Sylphon bellows 4, which bellows is closed by means of a metallic plate 5. The metallic plate 5 moves with the bellows and is connected to an Invar rod 6 which is located within the interior of the inner conductor 2 and extends below the end plate 3. A helical spring 7 within the inner conductor 2 and surrounding a portion of the Invar rod 6 is provided between a stationary plate 8 and a plate 9. Plate 9 is fastened to the Invar rod and is movable therewith relative to the inner conductor 2. It will thus be seen that the helical spring 7 exerts a pressure to force the Invar rod in a downward direction. A pair of prongs 10 attached to the plate 8 limits the movement of the bellows 4 to a desired range. The length of these prongs and the range of movement of the bellows 4 will depend upon the design of the resonator and the range of measurement to be made. A vernier condenser in the form of a rod 11 is inserted through an aperture in the outer conductor 1, as shown, for capacity coupling to the inner conductor 2 in order to provide a desired degree of adjustment of the conventric line resonator. Rod 11, it will be seen, is provided at one end with a capacity plate and at the other end with a knob for enabling a very fine adjustment of the length of the rod 11 within the interior of the resonator. An oscillator tube 12 having a suitable coupling loop 13 serves to excite the concentric line resonator. This tube 12 is mounted on the outside of the outer conductor 1 and is shielded by means of a shield box 14. Output from the concentric line resonator is taken by means of a loop 15 which is connected to a lead forming the inner conductor of a shielded transmission line TL extending to a shielded receiver 16.

The lower end of the Invar rod 6 which extends below the end plate 3 is adapted to rest upon the test sample 17 (here shown by way of example as a block) whose dimensions are to be measured. The block is designed to rest upon a suitable base or support 18. The concentric line resonator as a whole is mounted on base 18 by means of Invar supports 19, 19.

The receiver comprises a suitable frequency converter 20 which is supplied with energy both from the transmission line TL and with energy from a crystal oscillator 21. Oscillations from the crystal oscillator 21 are multiplied in frequency by frequency multiplier 22 before being applied to the frequency converter 20. The crystal multiplied frequency supplied to the frequency converter 20 should be different from the frequency supplied from line TL by an intermediate frequency whose deviations can be indicated on meter M, even though of rather small magnitude. The output from the frequency converter is amplified in an intermediate frequency amplifier 23, the latter in turn supplying energy to a suitable frequency discriminator 24. The output from the frequency discriminator is a direct current which appears in lead 25 and is supplied to the direct current meter M which is calibrated in dimensions, preferably millionths of an inch. If the intermediate frequency output from the frequency converter is a low intermediate frequency, then the discriminator 24 can be a known type of counter circuit which responds each time the beat frequency passes through zero. Such a counter circuit is well known in the art and produces a pulse as the beat frequency passes through zero. The number of these pulses is then averaged so that the direct current output from the discriminator is linearly proportional to the beat frequency. By suitable design, the discriminator may be of any other well known type and may include resonators or a crystal for obtaining very sharp slopes. This resonator, if desired, may be a well known Seeley type.

In the operation of the system of the invention, a standard block is first placed between the base 18 and the bottom of the Invar rod 6. The frequency of the concentric line resonator is then adjusted by means of the vernier condenser 11 so that the meter M in the receiver reads zero. The block is then replaced by suitable test sample 17. If the dimensions of this test sample deviate from that of the block, the overall length of the inner conductor 2 will change by virtue of a change in position of the Invar rod 6. A change in the overall length of the inner conductor 2 will produce a change in the resonant frequency of the concentric line which is supplied to the transmission line TL. Such a change in resonant frequency is indicated on the meter M, which as mentioned before is suitably calibrated in dimensions so as to give an indication as to how far the test sample deviates from the sample.

As an illustration, the concentric line resonator may normally operate at 500 megacycles. If the effective length of the concentric line resonator is approximately six inches, then the change in frequency of, let us say 100 cycles, would be $$\frac{100}{500,000,000} \times 6, \text{ or } \frac{600}{500,000,000}$$

or approximately one millionth of an inch. Obviously, in using the system of the invention as a gauge, a standard block accurate to one millionth part of an inch should be used to calibrate the apparatus.

Fig. 2 differs from Fig. 1 solely in the use of a resonant cavity which takes the place of the concentric line of Fig. 1. Since the apparatus of the system is identical with that of Fig. 1, the receiver has not been shown in Fig. 2. The resonant cavity is shown as a hollow metallic resonator whose walls are made of Invar or other suitable material having a very low temperature coefficient, coated on the inside with highly electrical conductive material such as gold, silver or copper. The resonant cavity is excited by means of an oscillator tube 12 having a loop 13 extending into the interior of the resonant cavity. The output loop 15 derives energy from the resonant cavity and passes this energy to a shielded cable TL extending to the receiver 16. The bottom of the resonant cavity is provided with a Sylphon bellows 40 having an enclosing end plate 5, which in turn has fastened thereto an Invar rod 6', as shown. The rectangular cavity is mounted on a suitable base 18 by means of Invar supports 19', 19'. The block or test sample 17 is adapted to be inserted between the base 18 and the bottom of the Invar rod 6'. A vernier condenser in the form of a rod 11 entering the resonant cavity serves to provide a suitable initial adjustment to obtain the zero setting of the meter M in the receiver. A gas valve 26 enables the interior of the resonant cavity to be maintained under suitable gas pressure to keep the bellows 40 in its initial position without the use of springs. Obviously, suitable gas tight and leak proof seals are provided at those points where the loops 13, 15 and the rod 11 enter the resonant cavity.

In using the system of the invention, only low power is necessary, and since radio frequency shielding is employed throughout the system, there is no external undesired radiation and hence no interference between the apparatus of the invention and other systems. Because the receiver does not require much power to be responsive, a small tube can be used for the oscillator. Probably a fraction of a watt would be all the radio frequency power required. In view of the fact that the receiver of the system is preferably operated on a fairly high level, it is not necessary to employ extreme sensitivity in the receiver; that is, because the receiver will operate with a greater input than is normally used on a receiver employing antenna pick-up, the receiver thus requires less gain in the intermediate frequency stages of operation.

Although the invention has been particularly described in connection with a meter as a frequency indicator, it should be understood that if desired the values of frequency deviation may be recorded by ink on a continuously advancing strip, if a continuous record is desired. One adaptation of the invention is to employ the variations in frequency of the electrical high frequency resonator of the invention to determine the penetration of a point or ball into the material and thereby measure hardness of the material.

What is claimed is:

1. An electrical dimension measuring system comprising an ultra high frequency oscillator whose frequency is controlled by the object to be observed, said oscillator including a low loss concentric line resonator having inner and outer hollow conductors fastened together at one end by an end plate, an aperture in said end plate, a rod of low temperature coefficient material within said inner conductor and connected to the other end of said inner conductor and freely passing through said aperture, the end of said rod which is remote from the last end of said inner conductor being free and adapted to rest on the object to be measured, whereby changes in dimensions of objects being tested vary the position of said rod with a corresponding change in the frequency of said oscillator, means for beating the output of said oscillator with oscillations of a constant and different radio frequency, and an indicator calibrated in dimensional units responsive to variations in the resultant beat frequency.

2. An electrical dimension measuring system comprising an ultra high frequency oscillator whose frequency is controlled by the object to be observed, said oscillator including a low loss concentric line resonator having inner and outer hollow conductors fastened together at one end by an end plate, an aperture in said end plate, a Sylphon bellows attached to the other end of said inner conductor, a rod of low temperature coefficient material within said inner conductor and connected to said bellows, said rod freely passing through the aperture of said end plate and terminating in a free end adapted to rest on the object to be measured, whereby changes in dimensions of objects being tested vary the position of said rod with a corresponding change in the frequency of said oscillator, means for beating the output of said oscillator with oscillations of a constant and different radio frequency, and an indicator calibrated in dimensional units responsive to variations in the resultant beat frequency.

3. An electrical dimension measuring system in accordance with claim 1, including a vernier condenser for making fine adjustments in the resonant frequency of said resonator.

4. An electrical dimension measuring system comprising an ultra high frequency oscillator whose frequency is controlled by the object to be observed, said oscillator including a cavity resonator as a frequency determining element, said resonator being made of a material having a low temperature coefficient which is coated on its interior with a high electrically conducting layer, movable means associated with said resonator for varying the resonant frequency of said cavity, said movable means having at least a portion located externally of said resonator and adapted to rest upon an object one of whose dimensions is to be measured, whereby the frequency of said cavity varies in accordance with the dimensions of the objects being measured, means for beating the output of said oscillator with oscillations of a constant and different radio frequency, and an indicator calibrated in dimensional units responsive to variations in the resultant beat frequency.

5. An electrical dimension measuring system comprising an ultra high frequency oscillator whose frequency is controlled by the object to be observed, said oscillator including a cavity resonator as a frequency determining element, said resonator being made of a material having a low temperature coefficient which is coated on its interior with a high electrically conducting layer, a Sylphon bellows in one side of said resonator, a rod of low temperature coefficient material fastened at one end to said bellows and adapted to rest at its other end on the object to be measured, whereby changes in the dimensions of the objects being tested vary the position of said rod and bellows with a corresponding change in the resonant frequency of said resonator, means for beating the output of said oscillator with oscillations of a constant and different radio frequency, and an indicator calibrated in dimensional units responsive to variations in the resultant beat frequency.

6. An electrical measuring system for determining the deviation of a material from a standard, comprising an ultra high frequency oscillator whose frequency is controlled by a resonant chamber, a metallic bellows for maintaining the frequency of said chamber constant despite changes in the ambient temperature, an element of low temperature coefficient of expansion linked to said bellows and responsive to a deviation of the material being tested from a standard for varying the frequency of said oscillator, a frequency converter coupled to the output of said oscillator, a highly stable source of radio frequency oscillations coupled to said frequency converter, said source having a frequency sufficiently different from the frequency of said oscillator to produce a beat frequency in the output of said converter whose deviations can be indicated, an intermediate frequency amplifier coupled to the output of said converter, a frequency discriminator coupled to the output of said amplifier for producing a direct current, and an indicator calibrated in dimensions coupled to the output of said discriminator.

7. An electrical dimension measuring system comprising an oscillator having a low loss, high frequency electrical resonator as a frequency determining element, said resonator having substantially uniformly distributed inductance and capacity and comprising an enclosed metallic chamber, a tuning probe for said element entering the interior of said chamber, a Sylphon bellows for said resonator adapted to change the parameters thereof, a rod linked to said bellows and adapted to rest upon an object whose dimension is to be tested, said rod being responsive to a deviation of the object to be tested from a standard for moving said bellows and hence varying the frequency of said oscillator, a frequency converter coupled to the output of said oscillator, a highly stable source of radio frequency oscillations coupled to said frequency converter, said source having a frequency sufficiently different from the frequency of said oscillator to produce a beat frequency in the output of said converter whose deviations can be indicated, an intermediate frequency amplifier coupled to the output of said converter, a frequency discriminator coupled to the output of said amplifier for producing a direct current, and an indicator calibrated in dimensions coupled to the output of said discriminator.

8. An electrical measuring system for determining the deviation of a material from a standard, comprising an ultra high frequency oscillator whose frequency is controlled by a resonant chamber, a metallic bellows for maintaining the frequency of said chamber constant despite changes in the ambient temperature, an element of low temperature coefficient of expansion linked to said bellows and responsive to a deviation of the material being tested from a standard for varying the frequency of said oscillator, a frequency converter coupled to the output of said oscillator, a highly stable source of radio frequency oscillations coupled to said frequency converter, said source having a frequency sufficiently different from the frequency of said oscillator to produce a beat frequency in the output of said converter whose deviations can be indicated, and an indicator calibrated in dimensional units and responsive to variations in the resultant beat frequency.

HALLAN E. GOLDSTINE.

REFERENCES CITED

The following references are of record in the file of this patent:

UNITED STATES PATENTS

| Number | Name | Date |
|---|---|---|
| 1,912,213 | Nicolson | May 30, 1933 |
| 2,288,838 | Pike et al. | July 7, 1942 |
| 2,124,209 | Conklin et al. | July 19, 1938 |
| 2,267,520 | Dow | Dec. 23, 1941 |